(12) United States Patent
Uslar Valenzuela

(10) Patent No.: US 8,978,584 B2
(45) Date of Patent: Mar. 17, 2015

(54) MILKING SYSTEM FOR MAMMALS, PREFERABLY CATTLE, THAT DIFFERENTIATES WHEN THE MILK IS OVER, COMPRISING A COLLECTOR, TEAT CUPS AND HOSES

(76) Inventor: William Ronnie Uslar Valenzuela, Santiago (CL)

( * ) Notice: Subject to any disclaimer, the term of this patent is extended or adjusted under 35 U.S.C. 154(b) by 401 days.

(21) Appl. No.: 13/255,311

(22) PCT Filed: Feb. 5, 2010

(86) PCT No.: PCT/CL2010/000011
§ 371 (c)(1),
(2), (4) Date: Sep. 8, 2011

(87) PCT Pub. No.: WO2010/096945
PCT Pub. Date: Sep. 2, 2010

(65) Prior Publication Data
US 2012/0031341 A1   Feb. 9, 2012

(30) Foreign Application Priority Data

Feb. 26, 2009   (CL) .................................... 437-2009

(51) Int. Cl.
*A01K 5/00* (2006.01)
*A01J 5/007* (2006.01)
(52) U.S. Cl.
CPC ....................................... *A01J 5/007* (2013.01)
USPC ..................................................... 119/14.08
(58) Field of Classification Search
CPC ........................................................ A01J 5/00
USPC .......... 119/14.01, 14.02, 14.05–14.08, 14.14,
119/14.18, 14.24, 14.29–14.31, 14.38,
119/14.53
See application file for complete search history.

(56) References Cited

U.S. PATENT DOCUMENTS 3,115,116 A * 12/1963 Schilling et al. ............ 119/14.08
3,556,053 A *  1/1971 Padman et al. ............. 119/14.08

(Continued)

FOREIGN PATENT DOCUMENTS

CN   1951179    4/2007
EP   0534565    9/1998

(Continued)

OTHER PUBLICATIONS

First action by the Chinese Patent Office (SIPO), dated Jan. 10, 2013, for corresponding Chinese Patent Application No. CN201080013991.7, filed Feb. 25, 2010 (6 pages).

(Continued)

*Primary Examiner* — Rob Swiatek
*Assistant Examiner* — Ebony Evans
(74) *Attorney, Agent, or Firm* — Hasse & Nesbitt LLC; Daniel F. Nesbitt

(57) ABSTRACT

A system that attached to mechanized milking equipment allows its automation that solves the subclinical mastitis by "differentiating" among each individual mammary quarter the time when teat cups must be removed after the milk is over, in an asynchronous and independent manner from other teat cups. Minimize the negative consequences of over-milking as a results of not removing teat cups on time after the milk flow has stopped; reduces economic, financial and productivity problems arisen as a result of subclinical mastitis mainly caused by over-milking; thus improving the product quality and amount. Mastitis produces somatic cells in milk, the greater the amount of these cells the lower the price received by the producer. Damage to the mammary gland may be permanent resulting in the loss of the gland and may be contagious.
The system includes teat cups, tubes, collector, discrete flow sensor, vacuum sensor, command control, software comprising as a part thereof the mammary quarters with physiological and anatomical characteristics thereof.

1 Claim, 1 Drawing Sheet

(56) References Cited

U.S. PATENT DOCUMENTS

| | | | |
|---|---|---|---|
| 3,726,252 A * | 4/1973 | Needham et al. | 119/14.08 |
| 3,773,016 A * | 11/1973 | Needham et al. | 119/14.08 |
| 4,306,517 A * | 12/1981 | Nakamura | 119/14.14 |
| 4,344,385 A * | 8/1982 | Swanson et al. | 119/14.08 |
| 4,574,736 A * | 3/1986 | Tanaka et al. | 119/14.08 |
| 5,080,040 A | 1/1992 | van den Lely et al. | |
| 5,195,456 A | 3/1993 | van der Lely et al. | |
| 5,568,788 A | 10/1996 | van der Berg et al. | |
| 5,873,323 A | 2/1999 | van der Berg et al. | |
| 6,079,359 A * | 6/2000 | van den Berg | 119/14.01 |
| 6,830,008 B2 * | 12/2004 | Sjolund et al. | 119/14.08 |
| 2002/0156589 A1 * | 10/2002 | Fematt | 702/45 |
| 2007/0209595 A1 * | 9/2007 | Umegard et al. | 119/14.02 |
| 2009/0211528 A1 | 8/2009 | Hoefelmayr | |

FOREIGN PATENT DOCUMENTS

| | | | |
|---|---|---|---|
| GB | 2124877 A * | 2/1984 | A01J 7/00 |
| RU | 2244417 | 1/2005 | |
| WO | 2005006849 | 1/2005 | |

OTHER PUBLICATIONS

First action by the Russian Patent Office, dated Jul. 8, 2013, for corresponding Russian Patent Application No. RU2011139131, filed Feb. 25, 2010 (5 pages).

* cited by examiner

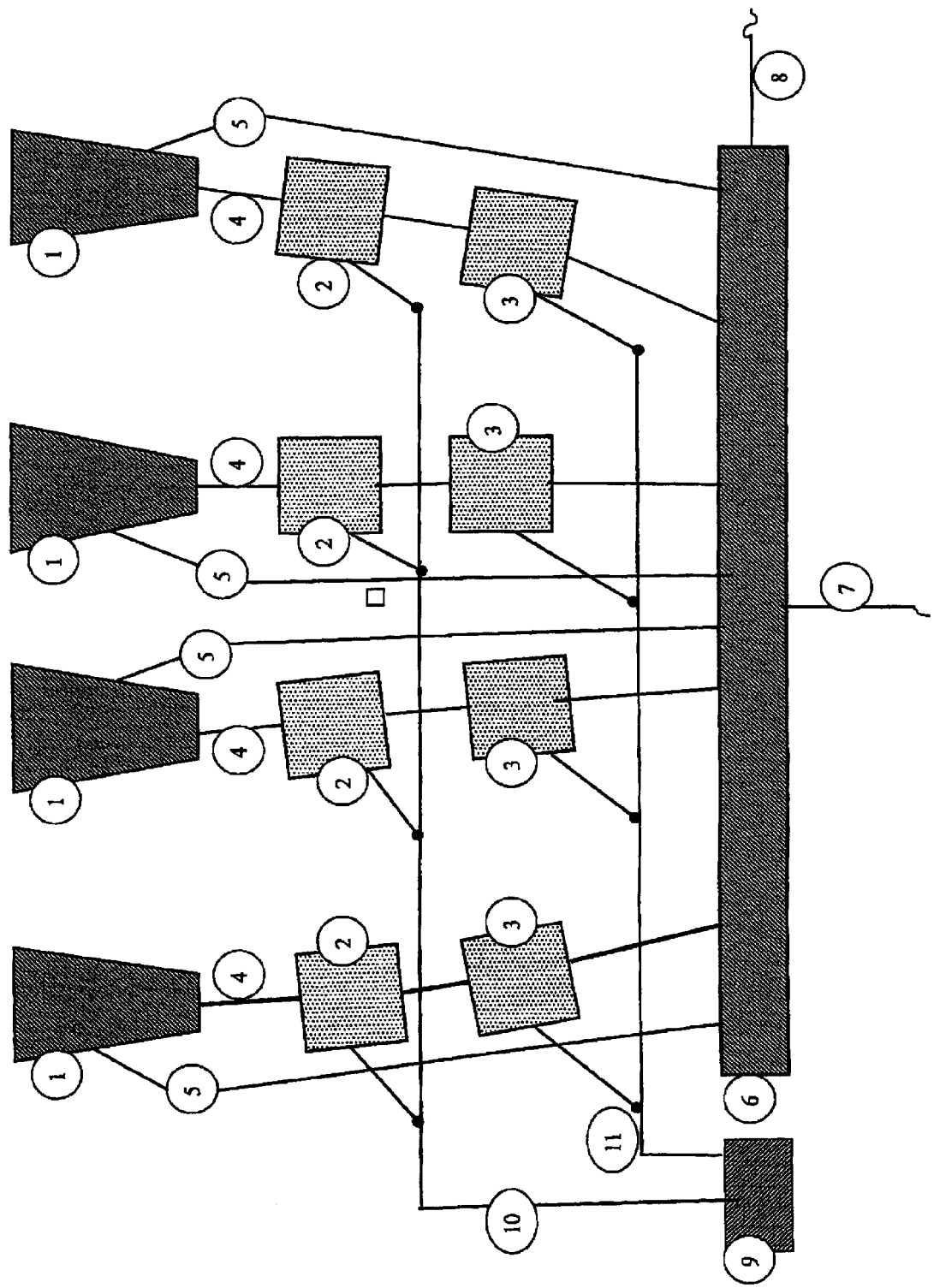

MILKING SYSTEM FOR MAMMALS, PREFERABLY CATTLE, THAT DIFFERENTIATES WHEN THE MILK IS OVER, COMPRISING A COLLECTOR, TEAT CUPS AND HOSES

The present patent of invention relates to a "Milking System for Mammals", preferably cattle.

BACKGROUND OF THE INVENTION

The milking process through current mechanized milking equipment (MME) consists extracting milk contained in the mammary gland quarts by means of applying a vacuum and also pulsatory system comprising a collector from which four teat cups are distributed, one per each mammary quarter; from the inside of the quarter the milk flows coming from the alveolar zone; the milk being deposited in an upper cistern attached by means of a sphincter muscle located between this and the teat. Therefore, these teat cups are the interconnection between the MME and cattle. As a result of applying vacuum to the teat, and to the pulsatory effect together with physiological aspect, the collection of milk contained is carried out in an open-loop manner under the terms of automatic control. Every mammary gland quarter is independent and is separate from the others. There is an amount of milk stored in such quarters at the level of the alveolar region; each quarter having different volumes. When the milk flow stops in the quarter containing the smaller amount of milk, relative to the others, the milking process continues until empties the content of the quarter containing the larger amount of stored milk. That is, if the quarter containing the smallest amount of milk is emptied in four minutes and the one containing the largest amount of milk is emptied in seven minutes, then we have 3 minutes of over-milking in the quarter of smallest capacity, and between 3 to 0 minutes of over-milking in the quarters emptied in second and third place.

The technical problem arisen from over-milking is represented by the occurrence of the disease called "subclinical mastitis"

Subclinical mastitis in turn causes additional technical drawbacks, such as:
A decreased flow of milk production estimated within the range between 15 and up to 45%
Increases drug cost involving disease treatment and cattle productivity recovery.
Lower prices paid to producers as a result of the increment of somatic cells and the reduction of fat content in the milk.
Decline in meat quality resulting from drugs treatments.
Decline in cattle service life.

The Milking System of the invention shown in FIGURE No. 1, consists of an alternative to removal of each of the teat cup automatically and independently when the milk volume is over in each particular mammary gland quarter, thus avoiding over-milking in each of the others. This system being carried out by a controller comprising specific elements and sensors, in a closed loop system under the terms of automatic control, since now the milking system "differentiates" and recognizes when the milk flow stops in every quarter in an independent and sequential manner relative to the other quarters.

FIGURE DESCRIPTION

FIGURE No 1 comprises an MME, depicting the teat cups in No1, discrete flow sensor in No 2, vacuum sensors in No 3, a short-pass hose milk in No 4, short hose pulsatory flow in No 5, milk collector in No 6, long hose milk in No. 7, long hose pulsatory flow in No 8, logic control in No 9, and interconnections between logic control and discrete flow and vacuum sensors, respectively in No 10 and 11.

DETAILED DESCRIPTION OF THE INVENTION

The proposed system is specifically connected to each duct of the MME which conveys the milk from the mammary quarter to the collector (see FIGURE No 1). The four teat cups, connected by means of a hose to the receiving milk collector, are the ones involved to insert between said teat cup and the collector two sensors per each teat cup, a discrete flow sensor and a vacuum sensor. Both sensors from each teat cup are connected to a logic control device which comprises electronic components and including a software that allows the removal of the teat cup corresponding to the mammary gland quarter under drug treatment.

The logic control (FIGURE No 1) is activated when the teat cups have been placed on the mammary quarters, and the sensor elements detects the presence of milk, which is pulsatory in each quarter. This is perceived by the controller in an independent manner for each mammary quarter, subsequently acknowledging the signal sent by the same sensor element when the milk flow stops from the specific mammary quarter.

Once the logic control acknowledges the signal indicating that the milk flow stops from such quarter, a pre-established interval takes place due to physiological reasons of the animal itself, and it commands to the vacuum sensor the removal of the specific teat cup. This process is repeated until the withdrawal from the four mammary quarters is completed.

Quadratic Model Fit (Quadratic Polynomial)

$$DMP, TS, FC, SNF = a + b^*(SCC) + c^*(CCS)^a \text{ wherein}^a = 2$$
$$y \qquad\qquad x \qquad x^a$$

Therefore: $y = a + bx + cx^a$ (Quadratic polynomial)

Main Parameters Determined in Milk Are:
SCC=Somatic cell count
TS=Total solids (Kgs/day)
SNF=Solid-Non Fat sól(Kgs/day)
FC=Fat content (Kgs/day)
The somatic cell count is made electronically as well as the compositional aspects.
DMP=Daily milk production (liters/day)
This scoring scale corresponds to the natural logarithm fraction e=2,8182

$$\left(\frac{\text{Cell count}}{100.000} + 3\right)$$

0=0–12,500 (cell./thousand)
1=12,501–25,000
2=25,001–50,000
3=50,001–100,000
4=100,001–200,000
5=200,001–400,000
6=400,001–800,000
7=800,001–1,600,000
8=1,600,001–3,200,000
9=3,200,001 and more Milk Quality Daily Control Sheet Manual Case

| YEAR 2009 | MONTH: | | DAY: |
|---|---|---|---|
| Parameters | B2 | B3 | Total Production |
| t ° C. | | | |
| Location | | | |
| Weather | | | |
| Bovine 2 (B2) | | | |
| Bovine 3 (B3) | | | |
| Milking time B2 (AM) | | | |
| Onset time B2 (min, sec) | | | |
| Finish time B2 (min, sec) | | | |
| Duration t B2 (min, sec) | | | |
| Milking time B3 (AM) | | | |
| Onset time B3 (min, sec) | | | |
| Finish time B3 (min, sec) | | | |
| Duration t B3 (min, sec) | | | |
| Milking time B2 (PM) | | | |
| Onset time B2 (min, sec) | | | |
| Finish time B2 (min, sec) | | | |
| Duration t B2 (min, sec) | | | |
| Milking time B3 (PM) | | | |
| Onset time B3 (min, sec) | | | |
| Finish time B3 (min, sec) | | | |
| Duration t B3 (min, sec) | | | |

Quality control criteria: Quadratic model fit
Model Parameters: SCC, TS, SNG, FC, DMP
Quadratic polynomial form: DMP, TS, FC, SNG = $a + b(SCC) + c(SCC)^a$
Bovine B2 = Second lactancy (Breed)
Bovine B3 = Third lactancy (Breed)

What is claimed is:

1. A complementary milking system which is operatively connected to a mechanized milking equipment (MME) for cattle, wherein the mechanized milking equipment includes four teat cups and a receiving milk collector, wherein each teat cup is connected to the receiving milk collector by one of four hoses, the complementary milking system fulfilling the need for a system that milks individually each mammary quarter regardless of milk flow volume and intensity found in the remaining udder quarters, thereby reducing the negative effect of under- and over-milking on the mammary health, by recognizing and differentiating when the flow of milk is over in each mammary gland quarter in an asynchronous, discrete manner, and independently from each other flow, and removes each teat cup when the milk flow in each mammary gland quarter is over; the complementary milking system including two sensors inserted into the hose between each teat cup and the receiving milk collector including a vacuum sensor and a discrete flow sensor, wherein the two sensors are connected to a logic control device comprising electronic components, forming a closed loop system;

wherein the discrete flow sensor is designed with delays for the operation thereof associated with the cattle and the logic control that, even without being previously set up or programmed with volumes of milk production, recognizes when milk flow is over, transforms a discrete and pulsing milk flow into a linear or continuous flow signal, and gives a command to the vacuum sensor, through the logic control, to remove the teat cup from that particular mammary gland quarter.

* * * * *